United States Patent [19]

Simpson

[11] Patent Number: 4,507,839
[45] Date of Patent: Apr. 2, 1985

[54] TWO-PIECE EAR TAG REMOVING TOOL

[76] Inventor: Floyd H. Simpson, 44680 Belmont-Centerville Rd., Belmont, Ohio 43718

[21] Appl. No.: 519,230

[22] Filed: Aug. 2, 1983

[51] Int. Cl.³ .......................... B23P 19/04; B25B 7/00
[52] U.S. Cl. ....................................................... 29/268
[58] Field of Search ................... 29/268, 283.5, 243.5, 29/239; 81/418–421, 425 R, 425 A, 426

[56] References Cited

U.S. PATENT DOCUMENTS

| 2,594,942 | 4/1952 | Lincoln | 29/268 |
| 3,006,063 | 10/1961 | Linan | 29/268 |
| 3,314,320 | 4/1967 | Early | 29/268 |
| 4,222,985 | 9/1980 | Greenleaf | 29/268 |
| 4,240,190 | 12/1980 | Bray | 29/268 |
| 4,365,411 | 12/1982 | Muldoon | 29/268 |
| 4,416,045 | 11/1983 | Staten | 29/268 |

Primary Examiner—Robert C. Watson
Attorney, Agent, or Firm—Harvey B. Jacobson

[57] ABSTRACT

A pair of opposing jaws are provided and mounted for relative movement toward and away from each other. One of the jaws includes an elongated stud supported therefrom including a free end projecting toward the other jaw and the other jaw defines a pair of laterally spaced generally parallel tongues having one pair of spaced apart free ends and defining an open ended elongated slot therebetween opening endwise outwardly between the tongue free ends. The free end of the stud is of a transverse dimension to be snugly lengthwise received through the slot upon movement of the jaws toward each other and the stud free end includes an endwise outwardly opening recess formed therein for receiving the conical tip of the male stud part of an animal ear tag therebetween. Further, the surfaces of the tongues facing the one jaw are laterally inclined toward the slot and away from the one jaw.

7 Claims, 6 Drawing Figures

TWO-PIECE EAR TAG REMOVING TOOL

BACKGROUND OF THE INVENTION

Two-piece ear tags of the type used on livestock include a tag part having a centrally apertured cone-shaped portion on the base end of the tag part and further include an elongated male stud part having an enlarged disc-shaped head on one end and a slightly enlarged conical tip on the other end which is wedgingly receivable through the centrally apertured cone-shaped portion on the tag part in order to attach the ear tag to one ear of an animal through which the male stud parts extends. The supportive animal ear part is received between the enlarged disc-shaped end of the male stud part and the base end of the tag part. In addition, some male stud parts include tapered heads on the ends thereof remote from the enlarged disc-shaped heads which are other than conical in configuration.

When ear tags are applied to the ear of an animal, the male stud part extends through the ear and the conical or other shaped tip end of the male stud part projects through the cone-shaped portion on the base end of the tag part. Accordingly, the ear tag heretofore could not be removed, except by cutting the male stud part. This cutting operation was and is presently being carried out either through the utilization of a knife or a pair of "side-cutter" pliers and the use of either type of these tools can be dangerous not only to the animal but also to the person manipulating these tools.

With the advent of the new insecticide ear tags which help cattle-men control flies, ticks and the lice on cattle for five months, the tags must be replaced at five-month intervals in order to maintain adequate insecticide control. This results in approximately 30 million tags being applied each year in the United States and results in considerable tag expense, if the male stud part of the tag is cut preventing its reuse.

On the other hand, ear tags have a considerable life expectancy and could be reused many times if some means could be provided to remove ear tags without inflicting pain on the tagged animal and without damaging the ear tag. Accordingly, a considerable need exists for an ear tag removal tool.

Examples of tools including some of the general structural and operational features of the instant invention are disclosed in U.S. Pat. Nos. 952,333, 1,678,313 and 2,594,942. However, these tools are not specifically adapted for removal of two-piece animal ear tags of the type above discussed.

BRIEF DESCRIPTION OF THE INVENTION

The ear tag removing tool comprises a pair of pliers including relatively pivotable levers defining a pair of opposing jaws at one set of corresponding ends and a pair of handles at the other pair of corresponding ends. One of the jaws includes an endwise outwardly projecting shank supported therefrom projecting toward the other jaw and the other jaw includes a pair of laterally spaced apart tongues including one pair of free ends and defining an elongated slot therebetween through which the free end of the shank is projectable when the jaws are moved toward each other. The sides of the tongues opposing the shank are transversely inclined toward the slot and away from the shank and the free end portion of the shank is of a dimension to be snugly received between the tongues when the jaws are moved toward each other. Also, the free shank end includes an endwise outwardly opening recess formed therein in which the enlarged tip end of the male shank portion of the two-piece ear tag may be wedgingly received.

The tag removing tool allows the disassembly of a two-part ear tag in a manner preventing injury to the associated animal ear and without damage to the ear tag thereby enabling its reuse.

The ear tag removing tool is also constructed in a manner enabling quick one-handed operation thereof and thereby facilitates substantially production line-type removal and reapplication of ear tags at the beginning of each five-month fly season. This in turn substantially reduces the man hours necessary to accomplish the control of flies, ticks and lice on a large herd of cattle.

The main object of the invention is to provide an ear tag removal tool which may be used in conjunction with a two-piece ear tag removal of the same in a manner enabling the use of the tag.

Another object of this invention is to provide an ear tag removable tool capable of quick one-handed operation.

Still another object of this invention is to provide an ear tag removal tool which may be used in conjunction with two-piece ear tags marketed by several different ear tag manufacturers.

A final object of this invention to be specifically enumerated herein is to provide an ear tag removal tool in accordance with the preceding objects and which will conform to conventional forms of manufacture, be of simple construction and easy to use so as to provide a device which will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is a vertical sectional view illustrating the relative position of the jaws of the tool and an associated ear tag preparatory to removal of the ear tag;

FIG. 5 is a sectional view of the jaws of the tool in operative association with an ear tag and with the jaws of the tool in intermediate ear tag removing positions; and FIG. 6 is a perspective view of the parallel equipped jaw of the ear tag removal tool.

DETAILED DESCRIPTION OF THE INVENTION

Figure 1:
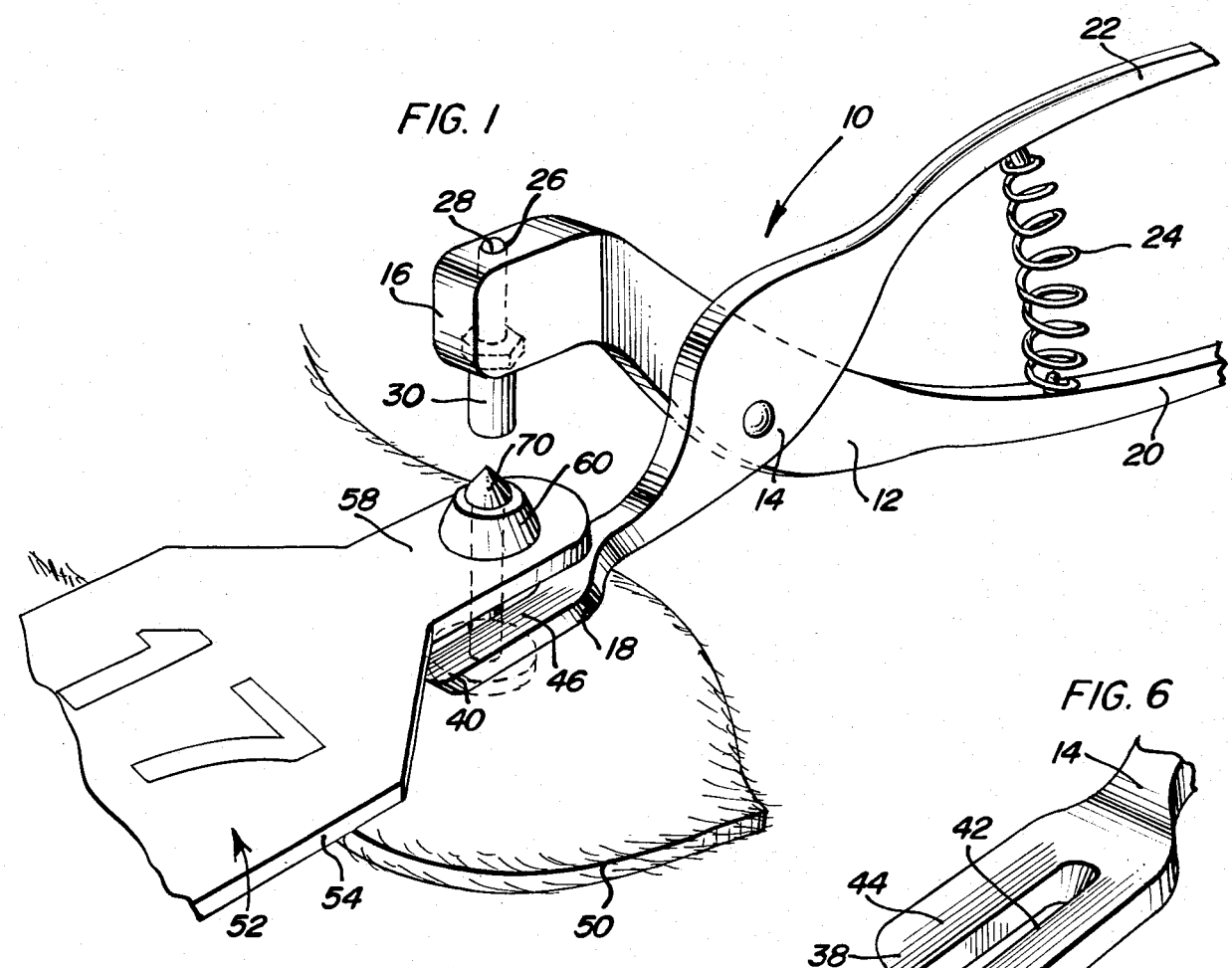
FIG. 1 is a perspective view of the ear tag removal tool of the instant invention in operative association with an ear mounted tag and preparatory to removal of the tag.
Figure 2:
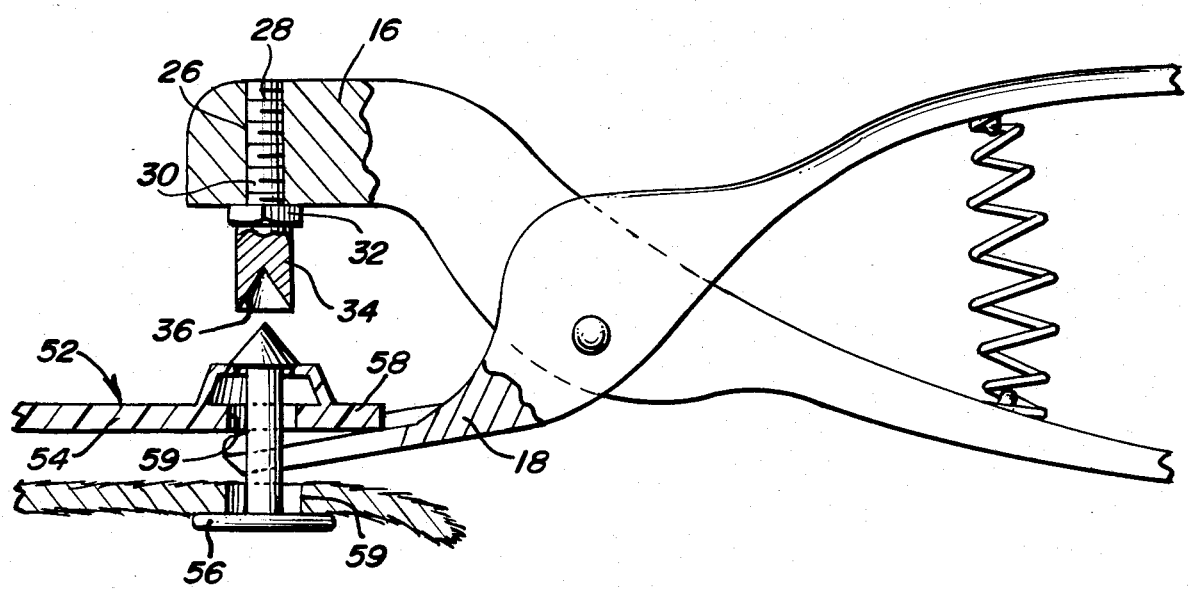
FIG. 2 is a side elevations view of the assemblage illustrated in FIG. 1 with portions of the ear tag and tool being illustrated in vertical sections.
Figure 3:
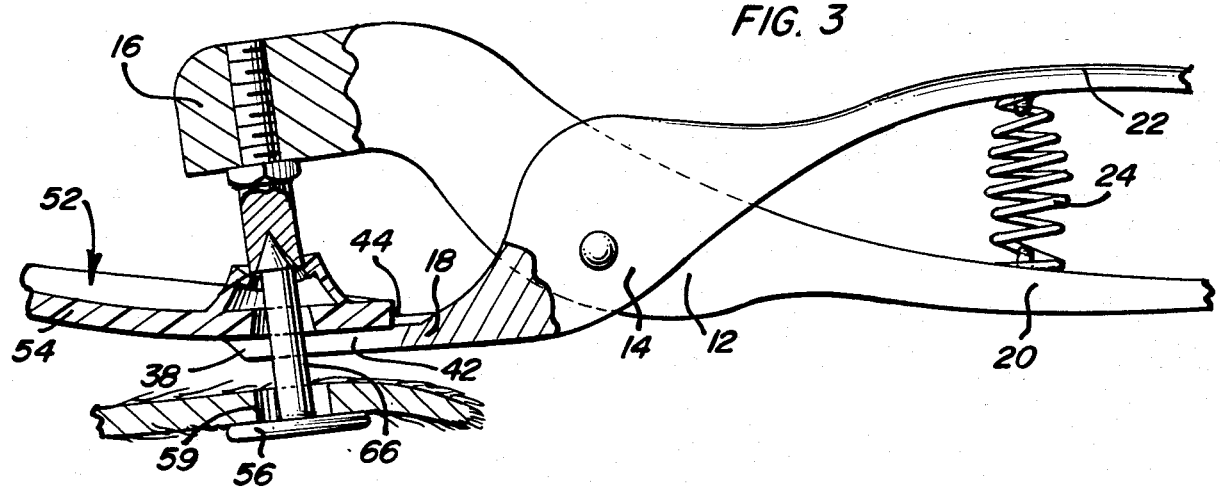
FIG. 3 is a view similar to FIG. 2 and illustrating the tool in operation during removal of the associated ear tag.

Referring now more specifically to the drawings, the numeral 10 generally designates the ear tag removing tool of the instant invention which includes a pair of crossed and pivotably connected levers 12 and 14 defining a first pair of jaw ends 16 and 18 and a second pair of handle ends 20 and 22. A compression spring 24 is disposed between the handle ends 20 and 22 for yieldingly biasing the latter apart and the first jaw end 16 includes a threaded bore 26 formed therethrough in which the threadeded mounting end of an elongated stud or shank 30 is threadedly engaged. An intermediate length portion 32 of the stud or shank 30 defines a noncircular enlargement with which a suitable wrench may be engaged in order to tighten the mounting end 28 in the bore 26 or to unthread the mounting end 28 therefrom and the end portion 34 of the stud or shank 30 remote from mounting end 28 projects outwardly of the jaw end 16 toward the jaw end 18. The outer end of the end portion 34 includes an endwise outwardly opening conical recess 36 formed therein.

The second jaw end 18 defines a pair of laterally spaced apart and generally parallel tongues 38 and 40 defining a slot 42 therebetween open at the outer ends of the tongues 38 and 40. The surfaces 44 and 46 of the tongues 38 and 40 which oppose the first jaw end 16 are inclined toward the slot 42 and away from the shank or stud 30.

The numeral 50 designates an animal's ear through which a conventional two-piece ear tag referred to in general by the reference numeral 52 is secured. The ear tag 52 includes a tag portion 54 and a male stud part portion 56. The tag portion 54 includes a base end 58 having an opening 59 formed therethrough about which a truncated cone-shaped projection 60 is disposed. The small diameter end of the projection 60 includes an end wall 62 which is centrally apertured as at 64 in registry with the opening 59 and the male stud part 56 includes a shank-type body 66 having a disc-shaped head 68 on one end and an endwise outwardly tapering enlarged conical tip 70 on its other end. When the ear tag 52 is installed on the animal's ear 50, the conical tip end of the body of the stud part 56 is forced through and forms an opening 59 in the ear 50 and is subsequently forced through the opening 58 as well as the opening 64, the conical tip 70 including a maximum diameter greater than the diameter of the opening 64 thereby preventing withdrawal of the conical tip 70 through the projection 60 and removal of the ear tag 52 from the ear 50.

However, when the tool 10 is used, the tongues 38 and 40 embracingly receive the cylindrical body 66 therebetween adjacent the side of the ear 50 remote from the head 68 and on the side of the base end or portion 58 of the tag portion 54 remote from the projection 60. Then with the end portion 34 and recess 36 registered with the conical tip, the handle ends 20 and 22 are squeezed together in order to seat the conical tip 70 in the conical recess 36. Inasmuch as the included angle of the recess 36 is slightly less than the included angle of the the conical tip 70, seating of the tip 70 within the recess 36 and the application of axial pressure on the conical tip 70 toward the head 68 causes the major portion of the conical tip 70 to be reduced in diameter and opposite pressure of the tongues 38 and 40 on the side of the base portion 58 remote from the projection 60 allows the end portion 34 to force the conical tip 70 back through the opening 64 in the manner illustrated in FIG. 5 of the drawings. Continued movement of the end portion 34 toward the tongues 38 and 40 engages the end portion 34 with the portions of the base portion 58 disposed about the opening 59 in order to deflect those engaged portions of the tag part 54 downwardly against the inclined surfaces 44 and 46 of the tongues 38 and 40 and thereby to enable the end portion 34 to force the conical tip 70 through the opening 59 completing disengagement of the ear tag 52 from the ear 50. In this manner, the ear tag 52 is removed without damaging either part thereof, thereby enabling reuse of the tag.

Although the ear tag 52 has been illustrated as including the conical tip on the male stud part 56, the tool 10 may also be used with a similar male stud part including an arrowhead tip rather than a conical tip. In addition, although the conical recess 36 has been found to function adequately in reducing the diameter of the conical tip 70 or a corresponding arrowhead tip, it is to be noted that other shaped recesses may also be used.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An ear tag removing tool including a pair of opposing jaws, means mounting said jaws for relative movement toward and away from each other, one of said jaws including an elongated stud supported therefrom including a free end projecting toward the other jaw, the other jaw defining a pair of laterally spaced generally parallel tongues having one pair of spaced apart ends and defining an open ended elongated slot therebetween opening endwise outwardly between said one pair of ends of said tongues, said free end of said stud being of a transverse dimension to be snugly lengthwise received through said slot upon movement of said jaws toward each other, said free end of said stud including an endwise outwardly opening recess formed therein for receiving the tapered enlarged tip of the male stud part of an animal ear tag therein, the surfaces of said tongues facing said one jaw being laterally inclined toward said slot and away from said one jaw, said recess comprising a conical recess.

2. The tool of claim 1 wherein said means mounting said jaws for relative movement comprise a pair of crossed and pivotally connected levers from one pair of corresponding ends of which said jaws are mounted, the other pair of corresponding ends of said levers comprising handle ends.

3. The tool of claim 2 including spring means connected between said levers yieldingly biasing said handle ends away from each other.

4. The tool of claim 1 wherein said slot opens endwise outwardly of the corresponding lever end.

5. The tool of claim 4 wherein said means mounting said jaws for relative movement comprise a pair of crossed and pivotally connected levers from one pair of corresponding ends of which said jaws are mounted, the other pair of corresponding ends of said levers comprising handle ends.

6. The tool of claim 5 including spring means connected between said levers yieldingly biasing said handle ends away from each other.

7. An ear tag removing tool including a pair of opposing jaws, means mounting said jaws for relative movement toward and away from each other, one of said jaws including an elongated stud supported therefrom including a free end projecting toward the other jaw, the other jaw defining a pair of laterally spaced generally parallel tongues having one pair of spaced apart ends and defining an open ended elongated slot therebetween opening endwise outwardly between said one pair of ends of said tongues, said free end of said stud being of a transverse dimension to be snugly lengthwise received through said slot upon movement of said jaws toward each other, the free end of said stud including an endwise outwardly opening recess formed therein for receiving the tapered enlarged tip of the male stud part of an animal ear tag therein, the surfaces of said tongues facing one jaw being laterally inclined toward said slot and away from said one jaw, said recess including at least an outer end portion which is substantially circular in cross-sectional shape and thus in adapted to receive and radially inwardly compress the base end of said tapered enlarged tip therein, the free end of said stud having a major transverse dimension only slightly greater than the major transverse dimension of said recess.

* * * * *